US010516361B2

(12) United States Patent
He et al.

(10) Patent No.: US 10,516,361 B2
(45) Date of Patent: Dec. 24, 2019

(54) SPACE VECTOR PULSE WIDTH MODULATION METHOD FOR SUPPRESSING COMMON-MODE VOLTAGE OF MULTIPHASE MOTOR

(71) Applicant: WUHAN UNIVERSITY, Hubei (CN)

(72) Inventors: Yigang He, Hubei (CN); Jian Zheng, Hubei (CN); Qiwu Luo, Hubei (CN); Hui Zhang, Hubei (CN); Baiqiang Yin, Hubei (CN); Liulu He, Hubei (CN); Jiajun Duan, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 16/019,506

(22) Filed: Jun. 26, 2018

(65) Prior Publication Data

US 2019/0253015 A1 Aug. 15, 2019

(30) Foreign Application Priority Data

Feb. 12, 2018 (CN) .......................... 2018 1 0147029

(51) Int. Cl.
*H02P 21/00* (2016.01)
*H02P 27/12* (2006.01)
*H02P 29/50* (2016.01)

(52) U.S. Cl.
CPC .......... *H02P 27/12* (2013.01); *H02P 21/0017* (2013.01); *H02P 29/50* (2016.02)

(58) Field of Classification Search
CPC .......... H02P 27/12; H02P 27/08; H02P 25/22; H02P 27/085; H02M 2001/123
See application file for complete search history.

(56) References Cited

U.S. PATENT DOCUMENTS

2016/0159235 A1* 6/2016 Yang .................. B60L 3/00
320/109

\* cited by examiner

*Primary Examiner* — Karen Masih
(74) *Attorney, Agent, or Firm* — JCIPRNET

(57) ABSTRACT

A space vector pulse width modulation (SVPWM) method for suppressing a common-mode voltage of a multiphase motor includes the following steps: (1) dividing all basic vectors of the multiphase motor into q types, and selecting therefrom x types having equal common-mode voltage magnitude of which an absolute value is smallest; (2) for each type in the x types of basic vectors, structuring y classes of auxiliary vectors according to an optimization model; (3) synthesizing reference vectors by virtue of the auxiliary vectors to obtain functioning time of basic vectors functioning in each switching period; and (4) obtaining an optimal functioning sequence of the basic vectors functioning in each switching period with fewest switching operations of a converter as a purpose. The present invention may effectively suppress a magnitude and frequency of the common-mode voltage of the multiphase motor without increasing calculation complexity or reducing other performance indexes.

6 Claims, 14 Drawing Sheets

SPACE VECTOR PULSE WIDTH MODULATION METHOD FOR SUPPRESSING COMMON-MODE VOLTAGE OF MULTIPHASE MOTOR

CROSS-REFERENCE TO RELATED APPLICATION

This application claims the priority benefit of China application serial no. 201810147029.0, filed on Feb. 12, 2018. The entirety of the above-mentioned patent application is hereby incorporated by reference herein and made a part of this specification.

BACKGROUND OF THE INVENTION

1. Field of the Invention

The present invention belongs to the fields of power electronics and power transmission, and particularly relates to a space vector pulse width modulation (SVPWM) method for suppressing a common-mode voltage of a multiphase motor.

2. Description of Related Art

Compared with a three-phase motor, a multiphase motor, due to a larger number of phase, can transmit higher power and have higher reliability under the same voltage or current class condition, and thus attracts more attentions in the fields of electric drive, wind power generation and the like. At present, researches on multiphase motor systems mostly focus on the aspects of body design and control strategies, and common-mode voltages of multiphase motors are researched less.

For cutting off a third harmonic current loop, every star node of a multiphase winding is usually isolated, and a voltage between the star node of the winding and a midpoint of a direct current bus of a pulse width modulation (PWM) converter is a common-mode voltage. During a practical application, a higher common-mode voltage may break down an insulating oil film to form a bearing current at a stator node, thereby burning out a motor. Moreover, quick changing of the common-mode voltage may produce noises and bring electromagnetic interference to surrounding components. Insulation aging, heating, mechanical noises, resonance and the like of the motor caused by the common-mode voltage may bring negative effect to operation of the motor. Therefore, it is necessary to suppress the common-mode voltage.

Methods for suppressing a common-mode voltage of a multiphase motor mainly focus on two aspects of hardware and software. Hardware methods mainly include arrangement of an additional filter and adoption of various structurally improved converters, and these methods may usually increase sizes and weights of equipment and increase cost of the equipment. Software methods mainly include making various improvements to a control law and a PWM algorithm, and the software methods may not directly increase the cost of the equipment. However, in present control laws and PWM algorithms, some may not achieve an obvious suppression effect, some increase calculation complexity and some reduce other performance indexes. For example, adopting a current prediction algorithm to reduce a common-mode voltage may reduce an amplitude of the common-mode voltage to be ⅙ of a voltage of a direct current bus, but the prediction algorithm may not only increase complexity of the algorithm but also bring the problem of inaccurate prediction. For another example, selected harmonics elimination PWM (SHEPWM) proposes using the concept of a common-mode harmonic performance factor to calculate a switching angle and searching for an appropriate modulation ratio to suppress the common-mode voltage, but a calculation process is particularly complex and not easy to implement.

SUMMARY OF THE INVENTION

For the shortcoming of an existing technology, the present invention is directed to a space vector pulse width modulation (SVPWM) method for suppressing a common-mode voltage of a multiphase motor. The method may effectively suppress a magnitude and frequency of the common-mode voltage of the multiphase motor without increasing calculation complexity or reducing other performance indexes, has a good harmonic suppression effect on a line voltage and a phase current and high steady state and dynamic performance of a torque and a rotating speed, and can be used for a high-performance multiphase power generation system, a multiphase excitation system and a multiphase driving system.

In order to solve the technical problem, the technical solution adopted by the present invention is implemented as follows.

An SVPWM method for suppressing a common-mode voltage of a multiphase motor comprises the following steps:

(1) dividing all basic vectors of the multiphase motor into q types, and selecting therefrom x types having equal common-mode voltage magnitude of which an absolute value is smallest;

(2) for each type in the x types of basic vectors, structuring y classes of auxiliary vectors according to an optimization model;

(3) synthesizing reference vectors by virtue of the auxiliary vectors to obtain functioning time of basic vectors functioning in each switching period; and (4) obtaining an optimal functioning sequence of the basic vectors functioning in each switching period with fewest switching operations of a converter as a target.

According to the foregoing solution, in step (1), when the multiphase motor comprises p isolated star nodes, p common-mode voltages exist; value combination of the p common-mode voltages results in q conditions, all the basic vectors are divided into the q types according to the q conditions; and the x types of basic vectors are selected from the q types of basic vectors, magnitudes of the p common-mode voltages of the x types of basic vectors are equal, and their absolute values are smallest.

According to the foregoing solution, in step (2), the optimization model is:

$$\max \left| \sum_h T_h V_h \right| \text{ electromechanical energy conversion plane}$$

$$\text{s.t.} \begin{cases} T_h \geq 0 \\ \sum_h T_h = T' \\ \left| \sum_h T_h V_h \right| = \lambda \end{cases}$$

non-electromechanical energy conversion subspace, wherein, in the optimization model, h is a basic vector number, $V_h$ is the $h^{th}$ basic vector in the $x_i^{th}$-type basic vectors, $T_h$ is the functioning time of the $h^{th}$ basic vector in the $x_i^{th}$-type basic vectors and is an optimization variable, $$\sum_h T_h$$

is total functioning time of each basic vector in the $x_i^{th}$-type basic vectors, T' is a control period, the control period being a time period shorter than the switching period, $$\left|\sum_h T_h V_h\right|$$

is a length of a synthesis result of the $x_i^{th}$-type basic vectors, λ is a parameter reflecting a magnitude of a harmonic voltage of the non-electromechanical energy conversion subspace, the harmonic voltage of the non-electrochemical energy conversion subspace is lower if λ is smaller, and a minimum value of λ is zero;

a target function of the optimization model is that the length of the synthesis result of the $x_i^{th}$-type basic vectors is largest on the electromechanical energy conversion plane, and there are three constraint conditions of the optimization model: the first constraint condition is that the functioning time of each basic vector in the $x_i^{th}$-type basic vectors is a nonnegative value, the second constraint condition is that the total functioning time of each basic vector in the $x_i^{th}$-type basic vectors is equal to the control period T', and the third constraint condition is that the length of the synthesis result of the $x_i^{th}$-type basic vectors is equal to λ in the non-electromechanical energy conversion subspace;

when λ comprises y values, that is, $λ=λ_0, λ_1, λ_2, \ldots, λ_{y-1}$, for the $x_i^{th}$-type basic vectors, y classes of auxiliary vectors, sequentially called as $x_i^{th}$-type $λ_0^{th}$-class auxiliary vectors, $x_i^{th}$-type $λ_1^{th}$-class auxiliary vectors, $x_i^{th}$-type $λ_2^{th}$-class auxiliary vectors, . . . , $x_i^{th}$-type $λ_{y-1}^{th}$-class auxiliary vectors, are structured; and for all of the x types of basic vectors, totally x·y classes of auxiliary vectors are obtained, the x·y classes of auxiliary vectors are stored offline, and during an online application, a plurality of classes of auxiliary vectors are selected from the x·y classes of auxiliary vectors to synthesize the reference vectors in real time according to a common-mode voltage performance requirement and a hail ionic voltage performance requirement (i.e., different values of λ).

According to the foregoing solution, in step (3), the reference vectors are synthesized by virtue of the auxiliary vectors, and in a synthesis process, only a synthesis condition of the electromechanical energy conversion plane is considered, and a synthesis condition of the non-electromechanical energy conversion subspace is not considered; there are x types of synthesis solutions, i.e. single-type synthesis solutions, double-type synthesis solutions, . . . , x–1-type synthesis solutions and x-type synthesis solutions, and for each type of synthesis solutions, when λ comprises y values, that is, $λ=λ_0, λ_2, λ_2, \ldots, λ_{y-1}$, there are y classes of synthesis solutions, and different solutions are selected according to a requirement; and for any solution, functioning time of each auxiliary vector in each switching period is obtained first, then the functioning time of each auxiliary vector is allocated to functioning basic vectors, and the functioning time of the basic vectors functioning in each switching period is finally obtained.

According to the foregoing solution, for the single-type synthesis solutions, when λ comprises y values, that is, $λ=λ_0, λ_1, λ_2, \ldots, λ_{y-1}$, there are $x_i^{th}$-type $λ_0^{th}$-class synthesis solutions, $x_i^{th}$-type $λ_1^{th}$-class synthesis solutions, $x_i^{th}$-type $λ_2^{th}$-class synthesis solutions, . . . , $x_i^{th}$-type $λ_{y-1}^{th}$-class synthesis solutions; and for the double-type synthesis solutions, when λ comprises y values, that is, $λ=λ_0, λ_1, λ_2, \ldots, λ_{y-1}$, there are $x_i^{th}+x_{i+1}^{th}$-type $λ_0^{th}$-class synthesis solutions, $x_i^{th}+x_{i+1}^{th}$-type $λ_1^{th}$-class synthesis solutions, $x_i^{th}+x_{i+1}^{th}$-type $λ_2^{th}$-Class synthesis solutions, . . . , $x_i^{th}+x_{i+1}^{th}$-type $λ_{y-1}^{th}$-class synthesis solutions.

According to the foregoing solution, in step (4), for any synthesis solution, for reducing switching loss of the converter, the optimal functioning sequence of the basic vectors functioning in each switching period follows a "lowest switching frequency" principle, and an optimality principle is adopted for sequencing, specifically as follows:

step 1: structuring a set G={$G_j$|j being a positive integer}, the set G comprising j elements, i.e. j basic vectors functioning in each switching period;

step 2: randomly selecting an element from the set G as a first vector, and removing the first vector from the set G with j–1 elements left;

step 3: arranging the first vector with each element in the set G, totally j–1 arrangements, selecting l arrangements corresponding to a lowest switching frequency, and removing the l vectors from the set G with (j–1–l) elements left;

step 4: arranging the l arrangements with each element in the set G, totally l·(j–1–l) arrangements, selecting w arrangements corresponding to a lowest switching frequency, and removing the w vectors from the set G with (j–1–l–w) elements left; and step 5: performing analogic processing according to step 4, and ending sequencing when there is 0 element left in the set G.

Compared with the existing technology, the present invention has the following beneficial effects.

1: According to the present invention, a magnitude and frequency of the common-mode voltage of the multiphase motor may be effectively and noticeably suppressed; in the present invention, those basic vectors corresponding to the smallest absolute value of the common-mode voltage are selected to synthesize the reference vectors, so that the absolute value of the common-mode voltage may be smallest; and in addition, in the present invention, those basic vectors corresponding to the equal magnitudes of the p common-mode voltages are selected to synthesize the reference vectors, so that the frequency of the common-mode voltage may be reduced, for example, the single-type synthesis solutions may make the frequency of the common-mode voltage 0.

2: Increase of calculation complexity is avoided: in operations of the four steps, only the operation of step (3), i.e., synthesis of the reference vectors, requires the functioning time of the basic vectors to be calculated on line, results of the operations of the other three steps, i.e. classification and selection of the basic vectors, structuring of the auxiliary vectors and design of the optimal functioning sequence of the basic vectors, may all be stored off line and directly called for online applications, and the functioning time of the basic vectors is required to be calculated on line for most of SVPWM, so that increase of the calculation complexity is avoided in the present invention.

3: Reduction in other performance indexes is avoided: in the present invention, auxiliary vectors which are 0 in the non-electromechanical energy conversion subspace may be structured, and then the reference vectors are synthesized by virtue of the auxiliary vectors, so that a good harmonic suppression effect on a line voltage and phase current of the motor may be achieved, and steady state and dynamic performance of a torque and a rotating speed are further improved.

DESCRIPTION OF THE EMBODIMENTS

A typical example of a multiphase motor is a dual-Y shifted-30° six-phase motor. The present invention will further be described below in combination with the accompanying drawings in detail with an SVPWM method for suppressing a common-mode voltage of a dual-Y shifted-30° six-phase motor as a specific embodiment.

Figure 1:
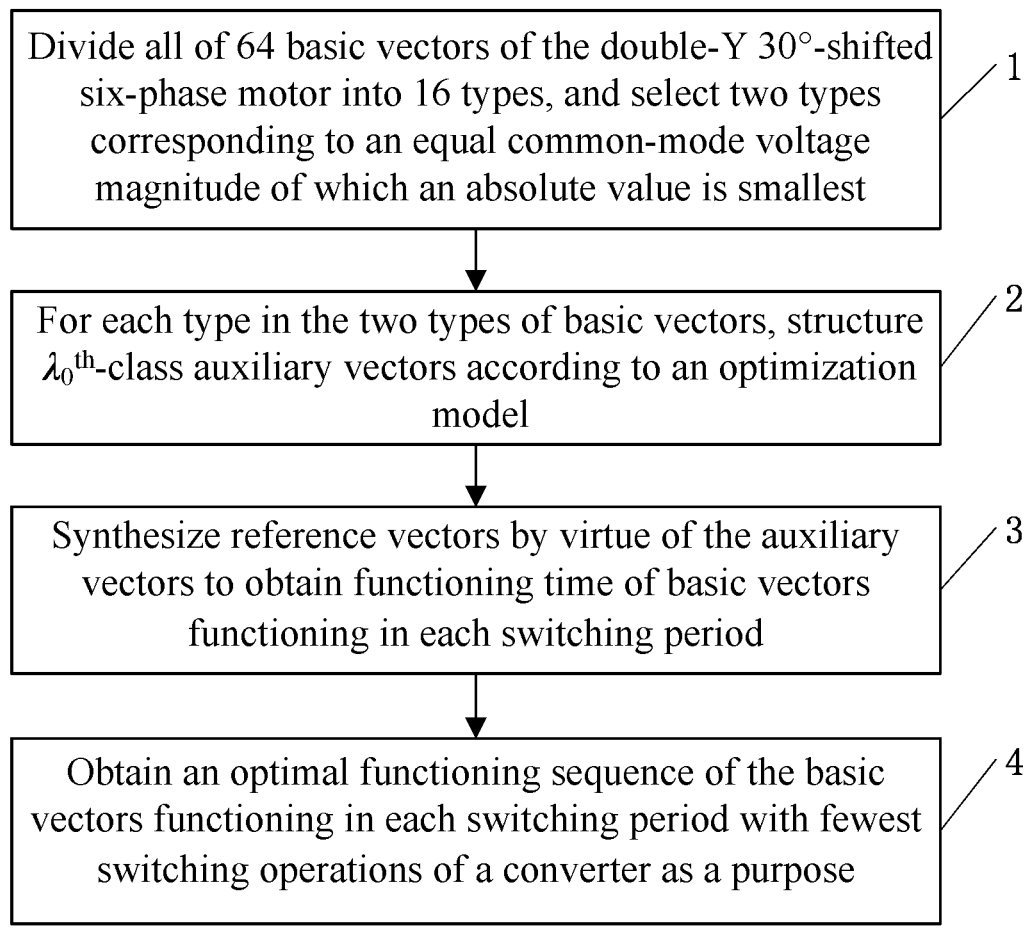
FIG. 1 is a flowchart of an SVPWM method for a common-mode voltage of a dual-Y shifted-30° six-phase motor according to an embodiment of the present invention.

Referring to FIG. 1, the embodiment of the present invention comprises the following steps:

(1) dividing all 64 basic vectors of the dual-Y shifted-30° six-phase motor into 16 types, and selecting two types corresponding to an equal common-mode voltage magnitude of which an absolute value is smallest;

(2) for each type in the two types of basic vectors, structuring $\lambda_0^{th}$-class auxiliary vectors according to an optimization model;

(3) synthesizing reference vectors by virtue of the auxiliary vectors to obtain functioning time of basic vectors functioning in each switching period; and (4) obtaining an optimal functioning sequence of the basic vectors functioning in each switching period with fewest switching operations of a converter as a target.

Figure 2:
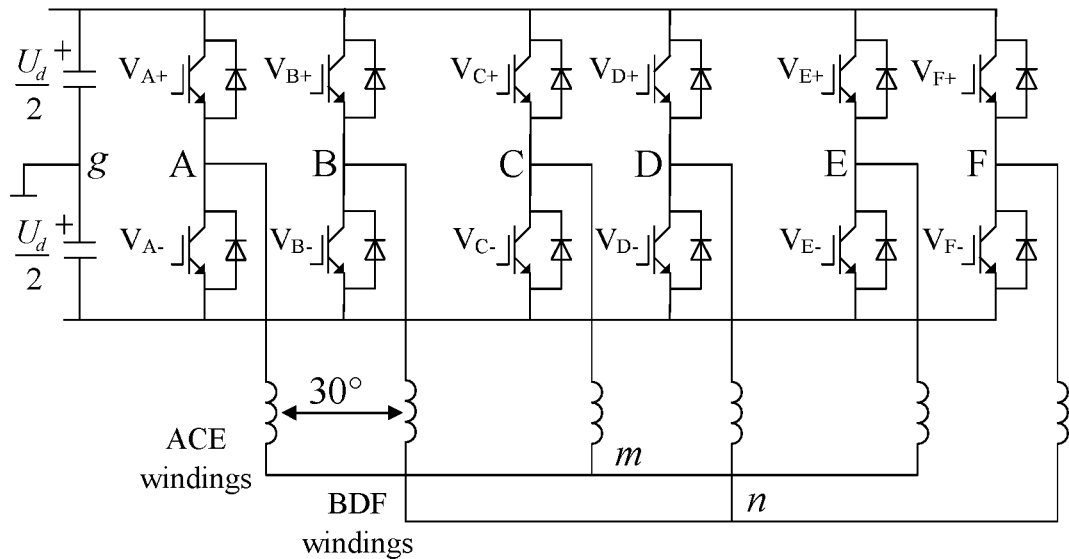
FIG. 2 is a schematic diagram of a hardware circuit of the embodiment shown in FIG. 1.

Two manners, i.e. isolated and unisolated, are adopted for star nodes of a multiphase winding, and for avoiding provision of a loop for a third harmonic current, the star nodes of the multiphase winding are usually isolated. Voltages between the suspended star nodes and a midpoint of a direct current bus of a PWM converter are common-mode voltages. Referring to FIG. 2, a stator of the dual-Y shifted-30° six-phase motor has six windings represented with A, B, C, D, E and F, and is formed by 30° phase shift of two sets of three-phase star windings, wherein the first set of three-phase star windings comprises the windings A, C and E, and the second set of three-phase star windings comprises the windings B, D and F. The two sets of windings have star nodes m and n in a suspended state respectively. Voltages between the suspended star nodes m and n and a midpoint g of a direct current bus of a converter are common-mode voltages which are represented with $u_{mg}$ and $u_{ng}$ respectively and may be calculated by the following equations:

$$u_{mg} = \frac{1}{3}(u_{Ag} + u_{Cg} + u_{Eg}) \text{ and} \quad (1)$$

$$u_{ng} = \frac{1}{3}(u_{Bg} + u_{Dg} + u_{Fg}). \quad (2)$$

In step (1), a classification and selection process of the basic vectors is as follows.

Figure 3A:
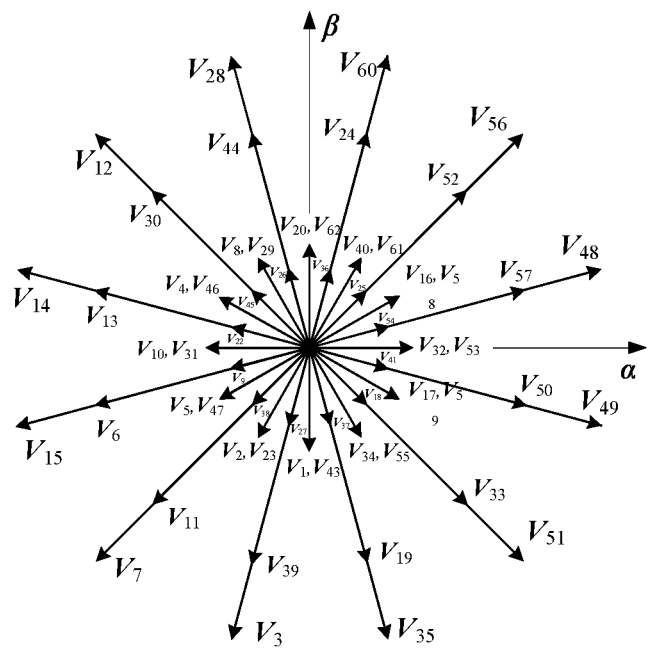
FIG. 3(a) is a distribution diagram of 64 basic vectors of the embodiment shown in FIG. 1 on an α-β plane (i.e., an electromechanical energy conversion plane).
Figure 3B:
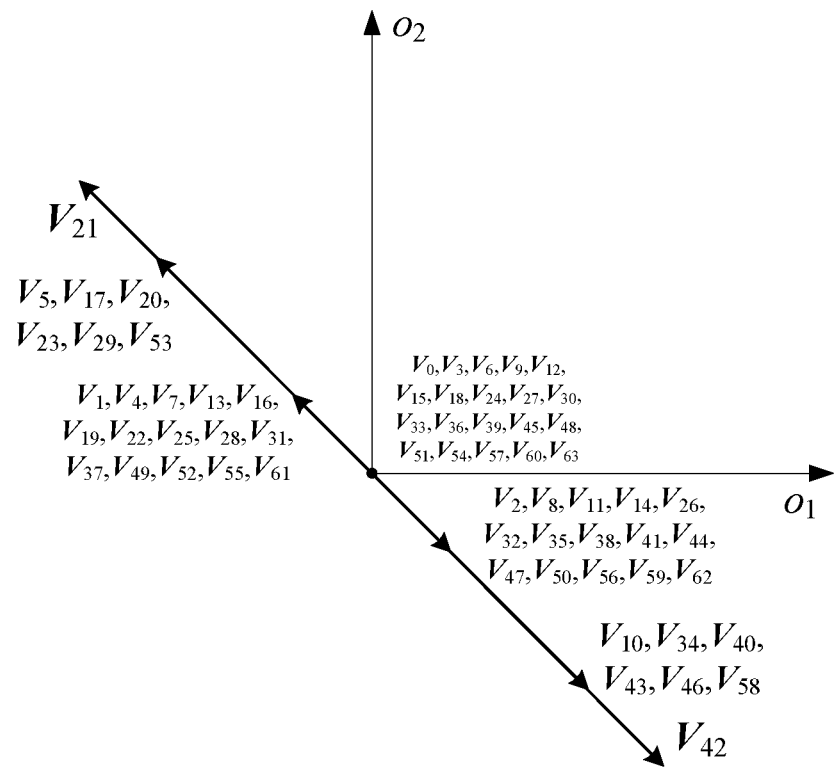
FIG. 3(b) is a distribution diagram of the 64 basic vectors of the embodiment shown in FIG. 1 on an $o_1$-$o_2$ plane (i.e., a plane of a non-electromechanical energy conversion subspace).
Figure 3C:
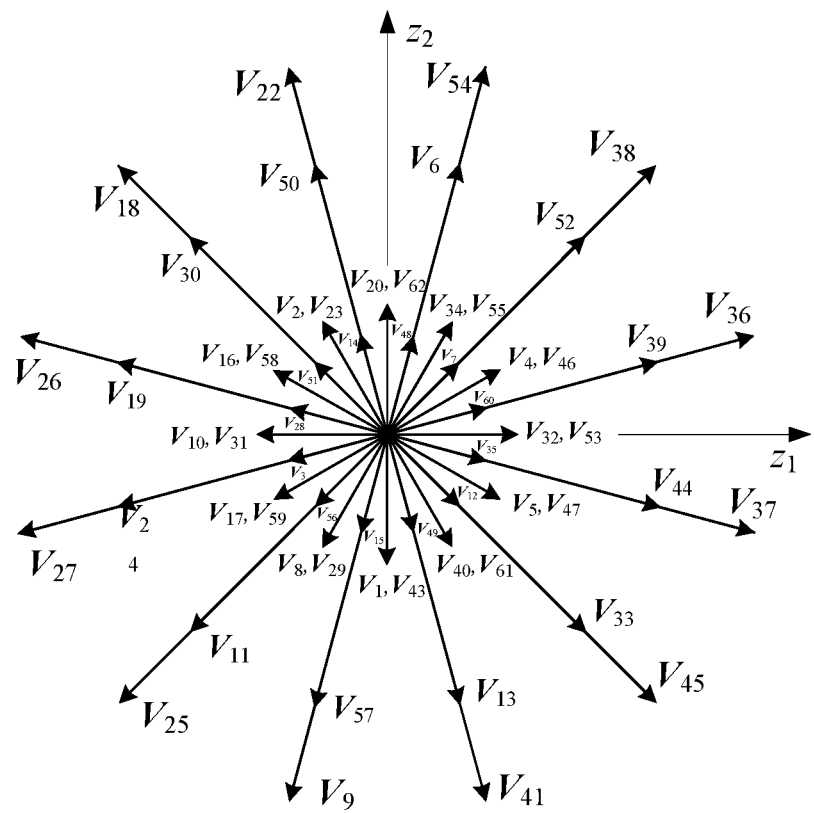
FIG. 3(c) is a distribution diagram of the 64 basic vectors of the embodiment shown in FIG. 1 on $\mu_1$-$\mu_2$ plane (i.e., a plane of the non-electromechanical energy conversion subspace).

Referring to FIG. 3, the converter has 64 switching states, and correspondingly, there are 64 stator winding voltages. According to a space vector decoupling method, a column matrix of the 64 winding voltages may be mapped to three decoupling planes, i.e. an α-β plane (i.e., an electromechanical energy conversion plane), an $o_1$-$o_2$ plane (i.e., a plane of a non-electromechanical energy conversion subspace) and a $\mu_1$-$\mu_2$ plane (i.e., a plane of the non-electromechanical energy conversion subspace), to obtain 64 basic voltage vectors.

TABLE 1

Classification Table of 64 Basic Voltage Vectors Shown in FIG. 1

|  |  | m is isolated from n | |
|---|---|---|---|
| Type | Basic voltage vector | $u_{mg}$ | $u_{ng}$ |
| I | $V_0$ | $-U_d/2$ | $-U_d/2$ |
| II | $V_1, V_4, V_{16}$ | $-U_d/2$ | $-U_d/6$ |
| III | $V_2, V_8, V_{32}$ | $-U_d/6$ | $-U_d/2$ |
| IV | $V_3, V_6, V_9, V_{12}, V_{18}, V_{24}, V_{33}, V_{36}, V_{48}$ | $-U_d/6$ | $-U_d/6$ |
| V | $V_5, V_{17}, V_{20}$ | $-U_d/2$ | $U_d/6$ |
| VI | $V_7, V_{13}, V_{19}, V_{22}, V_{25}, V_{28}, V_{37}, V_{49}, V_{52}$ | $-U_d/6$ | $U_d/6$ |
| VII | $V_{10}, V_{34}, V_{40}$ | $U_d/6$ | $-U_d/2$ |
| VIII | $V_{11}, V_{14}, V_{26}, V_{35}, V_{38}, V_{41}, V_{44}, V_{50}, V_{56}$ | $U_d/6$ | $-U_d/6$ |
| IX | $V_{15}, V_{27}, V_{30}, V_{39}, V_{45}, V_{51}, V_{54}, V_{57}, V_{60}$ | $U_d/6$ | $U_d/6$ |
| X | $V_{21}$ | $-U_d/2$ | $U_d/2$ |
| XI | $V_{23}, V_{29}, V_{53}$ | $-U_d/6$ | $U_d/2$ |
| XII | $V_{31}, V_{55}, V_{61}$ | $U_d/6$ | $U_d/2$ |
| XIII | $V_{42}$ | $U_d/2$ | $-U_d/2$ |
| XIV | $V_{43}, V_{46}, V_{58}$ | $U_d/2$ | $-U_d/6$ |
| XV | $V_{47}, V_{59}, V_{62}$ | $U_d/2$ | $U_d/6$ |
| XVI | $V_{63}$ | $U_d/2$ | $U_d/2$ |

Referring to Table 1, the two common-mode voltages $u_{mg}$ and $u_{ng}$ of the 64 basic vectors may be calculated according to equation (1) and equation (2) and have four values $-U_d/2$, $-U_d/6$, $U_d/6$ and $U_d/2$ ($U_d$ is a voltage of the direct current bus of the converter). The value combination of the two common-mode voltages result in 16 conditions. Therefore, the 64 basic vectors are divided into 16 types according to the 16 conditions, and the types are represented with I-XVI, wherein magnitudes of the two common-mode voltages generated by the IV$^{th}$-type and IX$^{th}$-type basic vectors are equal, and their absolute values are smallest. Therefore, the IV$^{th}$-type and IX$^{th}$-type basic vectors are selected.

In step (2), a structuring process of the $\lambda_0^{th}$-class auxiliary vectors is as follows.

The IV$^{th}$-type basic vectors comprise 9 basic vectors, and IV$^{th}$-type $\lambda_0^{th}$-class auxiliary vectors are structured according to the following optimization model:

$$\max \left| \sum_h T_h V_h \right| (\alpha - \beta \text{ plane}) \quad (3)$$

$$\text{s.t.} \begin{cases} T_h \geq 0 \\ \sum_h T_h = T' \\ \left| \sum_h T_h V_h \right| = 0 \end{cases}$$

$(o_1 - o_2 \text{ plane}, \mu_1 - \mu_2 \text{ plane})$, where $V_h$ (h=3, 6, 9, 12, 18, 24, 33, 36, 48) are the 9 basic vectors, $T_h$ is the corresponding 9 pieces of functioning time and is an optimization variable, $$\sum_h T_h$$

represents a sum of the 9 pieces of functioning time, T' is a control period shorter than the switching period, and $$\left| \sum_h T_h V_h \right|$$

is a length of a synthesis result of the 9 basic vectors.

A target function of equation (3) shows that, on the α-β plane, $$\left| \sum_h T_h V_h \right|$$

is as large as possible so as to increase a utilization rate of the voltage of the direct current bus; and constraint conditions of equation (3) show that, on the $o_1$-$o_2$ plane and the $\mu_1$-$\mu_2$ plane, $$\left| \sum_h T_h V_h \right|$$

is 0 so as to suppress $(12k\pm3)^{th}$ (k=0, 1, 2, . . . , similarly hereinafter) and $(12k\pm5)^{th}$ harmonic voltages. In the present invention, a sequential quadratic programming algorithm is adopted to solve equation (3) to obtain three optimal solutions:

$$\begin{cases} T_{24} = 0.1644T' \\ T_{12} = 0.6243T' \\ T_6 = 0.1644T' \\ T_{18} = 0.0469T' \end{cases} \quad (4)$$

$$\begin{cases} T_6 = 0.1644T' \\ T_3 = 0.6243T' \\ T_{33} = 0.1644T' \\ T_{36} = 0.0469T' \end{cases} \text{and} \quad (5)$$

-continued $$\begin{cases} T_{33} = 0.1644T' \\ T_{48} = 0.6243T' \\ T_{24} = 0.1644T' \\ T_9 = 0.0469T' \end{cases} \quad (6)$$

Figure 4A:
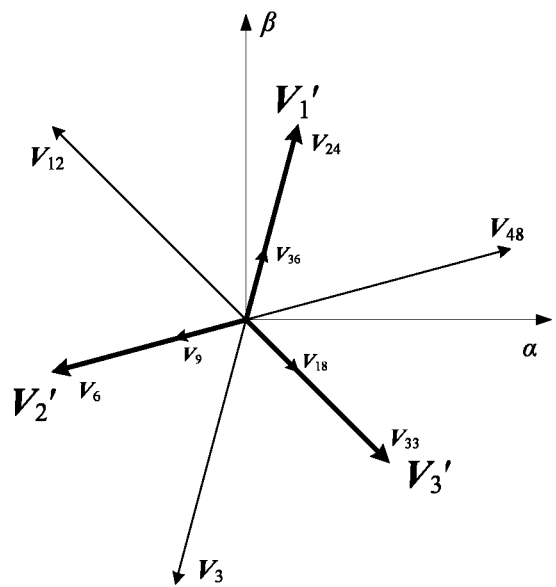
FIG. 4(a) is a distribution diagram of $IV^{th}$-type basic vectors and $IV^{th}$-type $\lambda_0^{th}$-class auxiliary vectors of the embodiment shown in FIG. 1 on the α-β plane.

Referring to FIG. 4(a), according to equation (4), the basic vectors $V_{24}$, $V_{12}$, $V_6$ and $V_{18}$ are synthesized according to the corresponding functioning time to obtain an auxiliary vector $V_1'$. Similarly, auxiliary vectors $V_2'$ and $V_3'$ can be obtained according to equation (5) and equation (6). The three auxiliary vectors are the $IV^{th}$-type $\lambda_0^{th}$-class auxiliary vectors, and they have the same length of 0.4714 $U_d$ and position differences of 120° on the α-β plane.

Figure 4B:
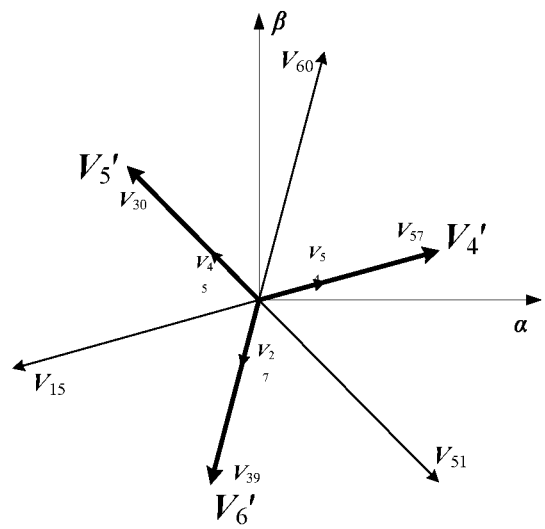
FIG. 4(b) is a distribution diagram of $IX^{th}$-type basic vectors and $IX^{th}$-type $\lambda_0^{th}$-class auxiliary vectors of the embodiment shown in FIG. 1 on the α-β plane.

Referring to FIG. 4(b), the $IX^{th}$-type basic vectors also comprise 9 basic vectors, and three auxiliary vectors $V_4'$, $V_5'$ and $V_6'$ can similarly be obtained according to the optimization model of equation (3). The three auxiliary vectors are $IX^{th}$-type $\lambda_0^{th}$-class auxiliary vectors, and they also have the same length of 0.4714 $U_d$ and position differences of 120° on the α-β plane. Referring to FIG. 4(a) and FIG. (b), it can be seen that $V_1'$ and $V_4'$ have a position difference of 60°.

In step (3), the reference vectors are synthesized by virtue of the auxiliary vectors, and in a synthesis process, only a synthesis condition of the electromechanical energy conversion plane is considered, and a synthesis condition of the non-electromechanical energy conversion subspace is not considered. The synthesis process of the reference vectors is as follows.

If only the $V_1'$, $V_2'$ and $V_3'$ are adopted for synthesis of the reference vectors, then it is an $IV^{th}$-type $\lambda_0^{th}$-class synthesis solution and belongs to a single-type synthesis solution; if only $V_4'$, $V_5'$ and $V_6'$ are adopted for synthesis of the reference vectors, then it is an $IX^{th}$-type $\lambda_0^{th}$-class synthesis solution and also belongs to a single-type synthesis solution; and if six auxiliary vectors $V_1'$-$V_6'$ are adopted for synthesis of the reference vectors, then it is an $IV^{th}$+$IX^{th}$-type $\lambda_0^{th}$-class synthesis solution and belongs to a double-type synthesis solution.

Figure 5A:
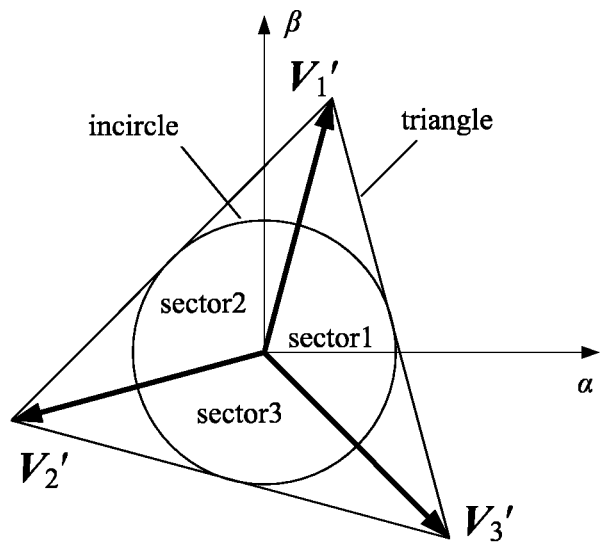
FIG. 5(a) is a schematic diagram of an $IV^{th}$-type $\lambda_0^{th}$-class synthesis solution of the embodiment shown in FIG. 1.

Referring to FIG. 5(a), adoption of only $V_1'$, $V_2'$ and $V_3'$ for synthesis of the reference vector $V_s$, i.e. the $IV^{th}$-type $\lambda_0^{th}$-class synthesis solution, belongs to a single-type synthesis solution. The α-β plane is divided into three sectors represented with sector1 to sector3 by taking the three auxiliary vectors as boundaries. In sector1, the reference vector is synthesized by virtue of the initial side auxiliary vector $V_3'$, terminal side auxiliary vector $V_1'$ and remaining auxiliary vector $V_2'$ of the sector, and the functioning time of the three auxiliary vectors is respectively:

$$\begin{cases} T_3' = \left(\frac{1}{3} + \sqrt{\frac{2}{3}} \frac{V_s}{U_d} \cos\theta\right) T_s \\ T_1' = \left[\frac{1}{3} + \sqrt{\frac{2}{3}} \frac{V_s}{U_d} \cos\left(\theta - \frac{2\pi}{3}\right)\right] T_s \\ T_2' = T_2 - T_3' - T_1' \end{cases} \quad (7)$$

where $V_s$ is a length of the reference vector $V_s$, θ is an included angle between the reference vector and the initial side auxiliary vector, and $T_s$ is the switching period. Calculation equations for the functioning time of the three auxiliary vectors in the other sectors are similar to equation (7).

$T_3'$ is substituted into T of equation (6), $T_1'$ is substituted into T of equation (4), $T_2'$ is substituted into T of equation (5), and then the respective functioning time of the 9 basic vectors in a switching period may be obtained.

Figure 5B:
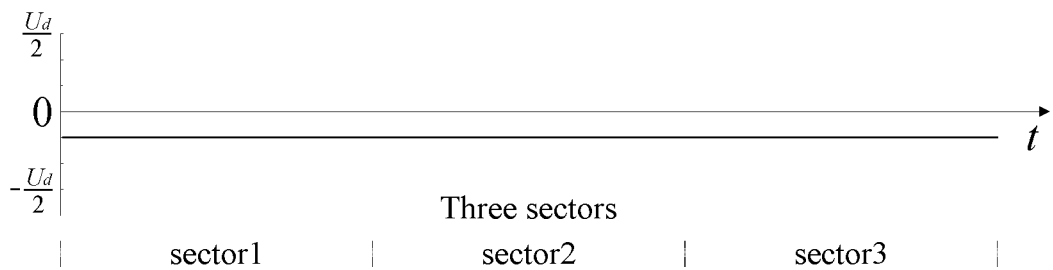
FIG. 5(b) is a waveform of the common-mode voltage in the $IV^{th}$-type $\lambda_0^{th}$-class synthesis solution of the embodiment shown in FIG. 1.
Figure 5B:
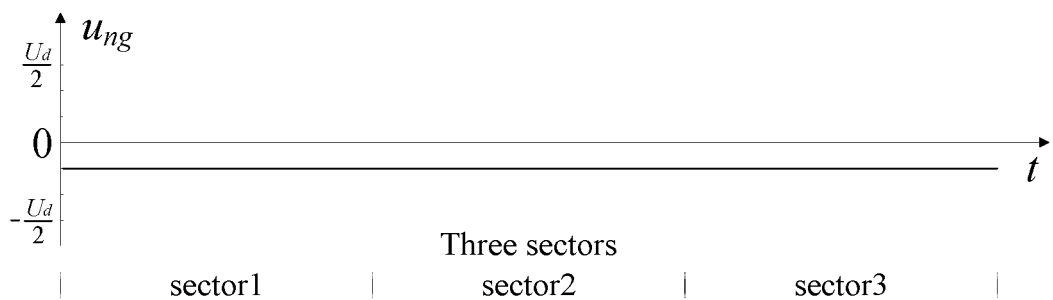

Referring to FIG. 5(a), in a linear modulation range, a maximum length of the reference vector is equal to a radius of an incircle of a triangle, and its value is 0.2357 $U_d$. Referring to FIG. 5(b), theoretical waveforms of the two common-mode voltages are the same, amplitudes are $-U_d/6$ and frequency is 0.

Figure 6A:
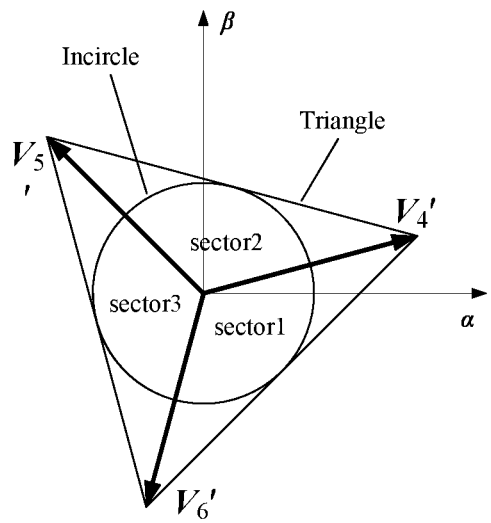
FIG. 6(a) a schematic diagram of an $IX^{th}$-type $\lambda_0^{th}$-class synthesis solution of the embodiment shown in FIG. 1.

Referring to FIG. 6(a), adoption of only $V_1'$, $V_2'$ and $V_3'$ for synthesis of the reference vector $V_s$, i.e. the $IX^{th}$-type $\lambda_0^{th}$-class synthesis solution, belongs to a single-type synthesis solution. Sector division and functioning time calculation are similar to the $IV^{th}$-type $\lambda_0^{th}$-class synthesis solution.

Figure 6B:
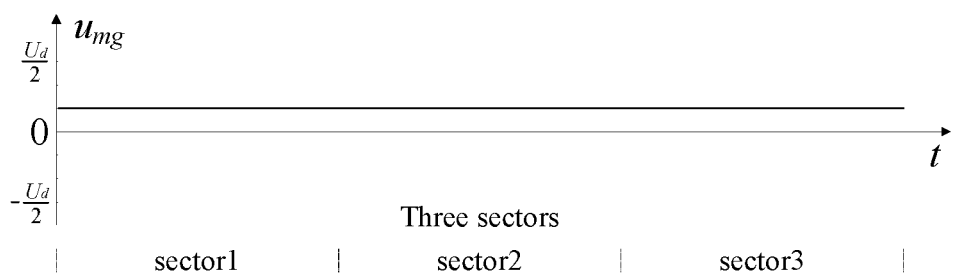
FIG. 6(b) is a theoretical waveform of the common-mode voltage in the $IX^{th}$-type $\lambda_0^{th}$-class synthesis solution of the embodiment shown in FIG. 1.
Figure 6B:
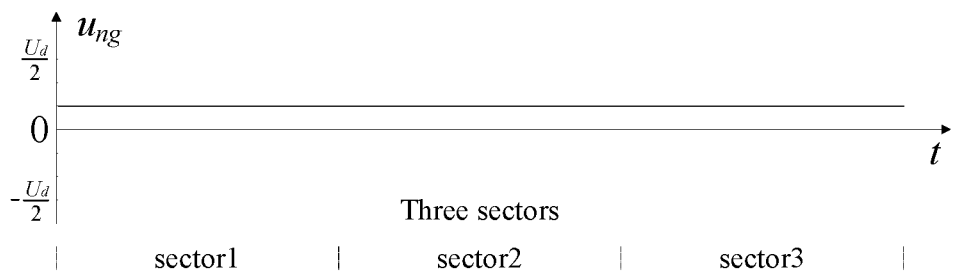

Referring to FIG. 6(a), in a linear modulation range, a maximum length of the reference vector is equal to a radius of an incircle of a triangle, and its value is 0.2357 $U_d$. Referring to FIG. 6(b), theoretical waveforms of the two common-mode voltages are the same, amplitudes are $U_d/6$ and frequency is 0.

Figure 7A:
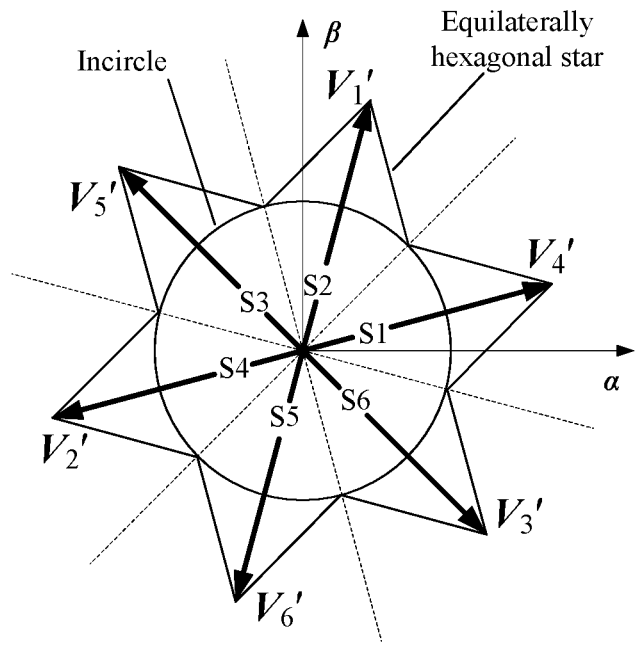
FIG. 7(a) is a schematic diagram of an $IV^{th}+IX^{th}$-type $\lambda_0^{th}$-class synthesis solution of the embodiment shown in FIG. 1.

Referring to FIG. 7(a), for increasing the maximum length of the reference vector, the six auxiliary vectors $V_1'$-$V_6'$ may be adopted to synthesize the reference vector, i.e. the $IV^{th}$+$IX^{th}$-type $\lambda_0^{th}$-class synthesis solution, which belongs to a double-type synthesis solution. An equilaterally hexagonal star in FIG. 7(a) is a union region of the triangle in FIG. 5(a) and the triangle in FIG. 6(a). Since all of the six auxiliary vectors may be used for synthesis, in a linear modulation range, a maximum length of the reference vector is equal to a radius of an incircle of the hexagonal star and is 0.3333 $U_d$. A circumference of the incircle may be divided into six segments corresponding to six sectors represented with S1-S6. In the sectors S1, S3 and S5, $V_4'$, $V_5'$ and $V_6'$ are adopted to synthesize the reference vector, and in the sectors S2, S4 and S6, $V_1'$, $V_2'$ and $V_3'$ are adopted to synthesize the reference vector.

Figure 7B:
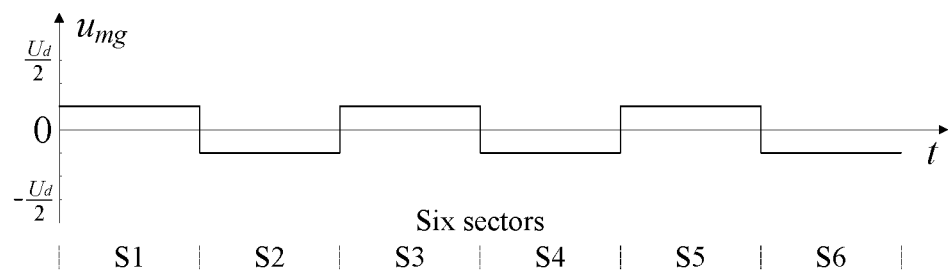
FIG. 7(b) is a theoretical waveform of the common-mode voltage in the $IV^{th}+IX^{th}$-type $\lambda_0^{th}$-class synthesis solution of the embodiment shown in FIG. 1.
Figure 7B:
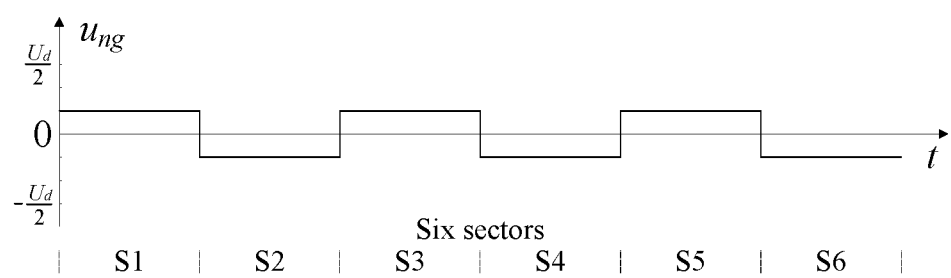

Referring to FIG. 7(b), theoretical waveforms of the two common-mode voltages are the same, peak values are $U_d/6$, valley values are $-U_d/6$, and the numbers of pulse repetitions of the common-mode voltages in a fundamental period of a line voltage are 3.

In step (4), a design process for the optimal functioning sequence of the basic vectors is as follows.

For any synthesis solution, there are 9 basic vectors functioning in each switching period. There are 9!=362880 functioning sequences of the 9 basic vectors. For reducing switching loss of the converter, design of the optimal functioning sequence follows a "fewest switching operations" principle. Inspection of switching operations corresponding to the 362880 functioning sequences one by one may bring an excessively high workload and is unlikely to implement. According to an optimality principle, the following sequencing method is proposed in the present invention, comprising:

step 1: structuring a set G={Gj|j=1, 2, 3, . . . , 9}, the set G comprising 9 elements, i.e. the 9 basic vectors functioning in each switching period;

step 2: randomly selecting an element from the set G as a first vector, and removing the first vector from the set G with 8 elements left;

step 3: arranging the first vector with each element in the set G, totally 8 arrangements, selecting l arrangements corresponding to a lowest switching frequency, and removing the l vectors from the set G with (8−l) elements left;

step 4: arranging the l arrangements with each element in the set G, totally l·(8−l) arrangements, selecting w arrangements corresponding to a lowest switching frequency, and removing the w vectors from the set G with (8−l−w) elements left; and step 5: performing analogic processing according to step 4, and ending sequencing when there is 0 element left in the set G.

This sequencing method is low in workload, the optimal functioning sequence may be fast obtained by programming, and the corresponding switching operations is 18.

Figure 8A:
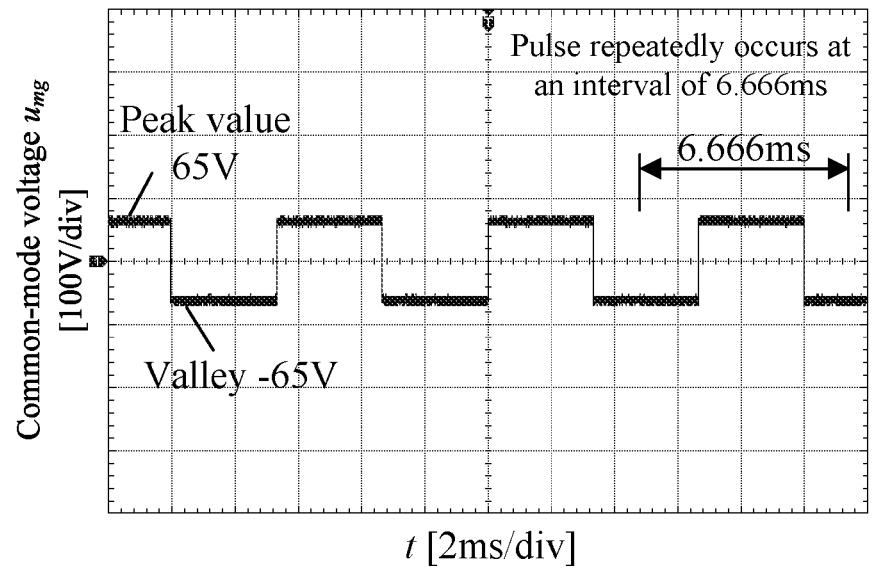
FIG. 8(a) is an experimental waveform of the common-mode voltage in the $IV^{th}+IX^{th}$-type $\lambda_0^{th}$-class synthesis solution of the embodiment shown in FIG. 1.
Figure 9A:
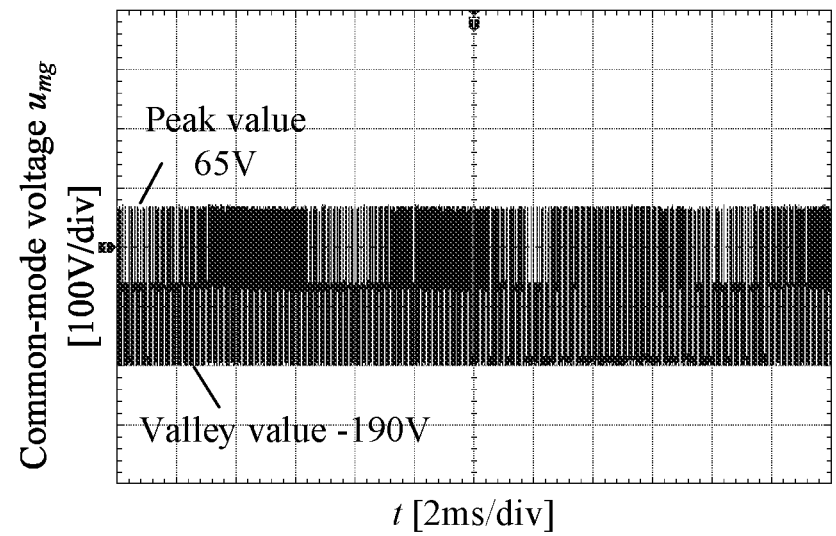
FIG. 9(a) is an experimental waveform of a common-mode voltage in a common-mode voltage suppression-free SVPWM method.

Referring to FIG. 8(a) and FIG. 9(a), it can be seen that the peak value, valley value and peak-valley value of the common-mode voltage in the $IV^{th}+IX^{th}$-type $\lambda_0^{th}$-class synthesis solution of the present invention are 65V, −65V and 130V respectively, while those in a common-mode voltage suppression-free SVPWM method are 65V, −190V and 255V respectively. The common-mode voltage in the two methods have the same peak value but different valley values, and an absolute value of the valley value of the latter is far larger than that of the former because a zero vector is used in the latter but no zero vector is used in the former.

Figure 9B:
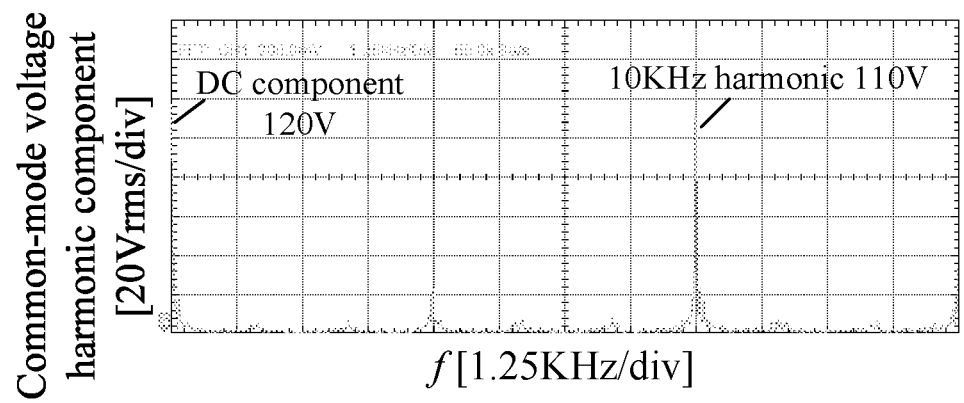
FIG. 9(b) is a spectral analysis (FFT analysis) on the experimental waveform of the common-mode voltage in the common-mode voltage suppression-free SVPWM method.
Figure 9C:
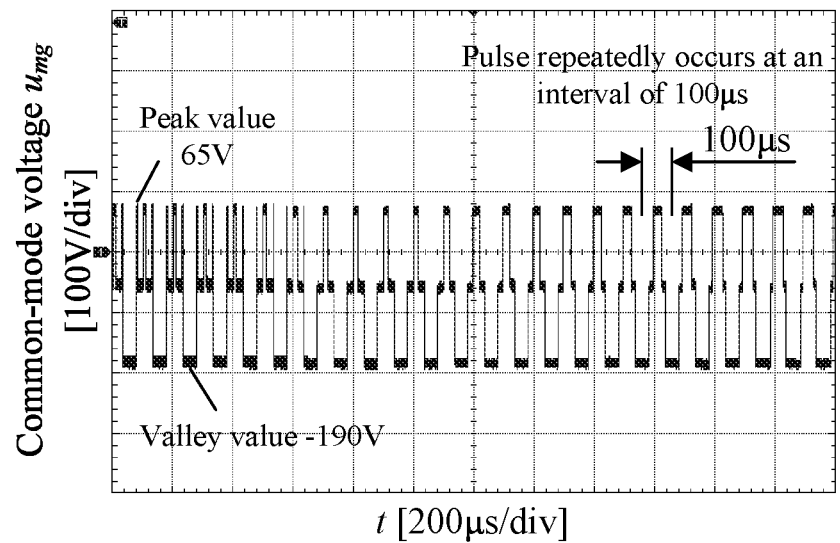
FIG. 9(c) is a partial enlargement of the experimental waveform of the common-mode voltage in the common-mode voltage suppression-free SVPWM method.

Referring to FIG. 8(a) and FIG. 9(c), it can be seen that a pulse of the common-mode voltage in the $IV^{th}+IX^{th}$-type $\lambda_0^{th}$-class synthesis solution of the present invention repeatedly occurs once at an interval of only 6.666 ms, so that the frequency is 150 Hz, only triple of a rotational frequency of the reference vector (i.e. a fundamental frequency of the line voltage) and far lower than the switching frequency of the converter. The pulse of the common-mode voltage in the common-mode voltage suppression-free SVPWM method repeatedly occurs once at an interval of 100 μs, so that the frequency is 10 kHz and equal to the switching frequency of the converter.

Figure 8B:
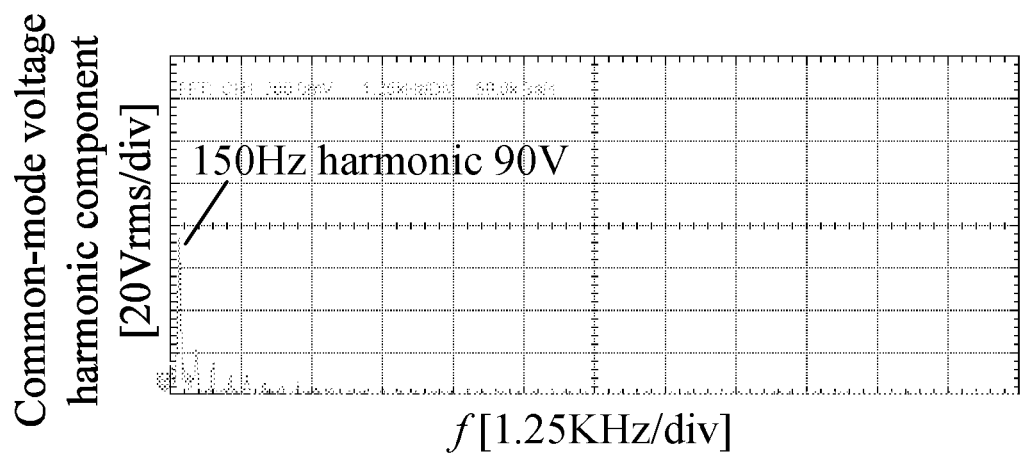
FIG. 8(b) is a spectral analysis (Fast Fourier Transform (FFT) analysis) on the experimental waveform of the common-mode voltage in the $IV^{th}+IX^{th}$-type $\lambda_0^{th}$-class synthesis solution of the embodiment shown in FIG. 1.

Referring to FIG. 8(b) and FIG. 9(b), it can be seen that high-frequency harmonics of the common-mode voltage in the $IV^{th}+IX^{th}$-type $\lambda_0^{th}$-class synthesis solution of the present invention are very low, while the common-mode voltage in the common-mode voltage suppression-free SVPWM method has high-frequency harmonics, wherein a 10 KHz (i.e. one time of the switching frequency) harmonic is relatively higher.

Figure 10A:
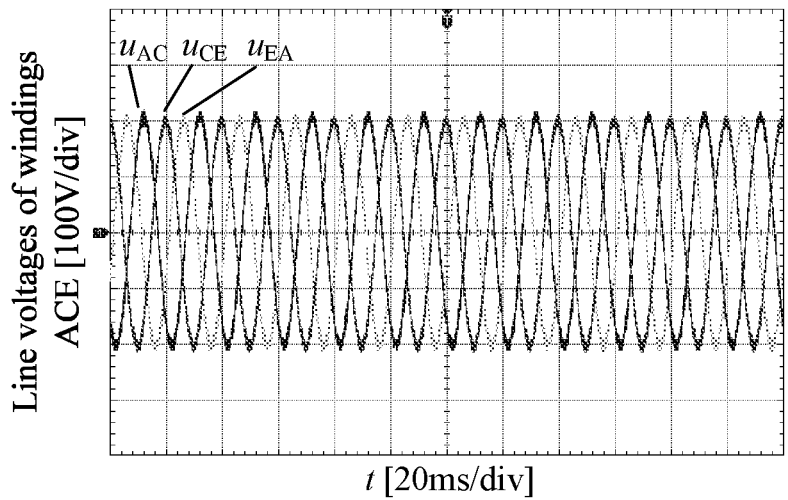
FIG. 10(a) is an experimental waveform of line voltages (after low-pass filtering) of windings ACE in the $IV^{th}+IX^{th}$-type $\lambda_0^{th}$-class synthesis solution of the embodiment shown in FIG. 1.

Referring to FIG. 10(a), it can be seen that line voltages $u_{AC}$, $u_{CE}$ and $u_{EA}$ of the windings ACE in the $IV^{th}+IX^{th}$-type $\lambda_0^{th}$-class synthesis solution of the present invention after low-pass filtering are all sinusoidal waves, amplitudes are all about 210V, frequency is 50 Hz, phase differences are sequentially 120°, and there are no third, fifth and seventh low-frequency harmonics and the like. Since the $IV^{th}$-type and $IX^{th}$-type basic vectors adopted for the $IV^{th}+IX^{th}$-type $\lambda_0^{th}$-class synthesis solution of the present invention are zero on the $o_1$-$o_2$ plane, the line voltages comprise no $(12k\pm3)^{th}$ harmonics. Since the auxiliary vectors $V_1'$-$V_6'$ structured in the present invention are zero on the $\mu_1$-$\mu_2$ plane, the line voltages comprise quite low $(12k\pm5)^{th}$ harmonics.

Figure 10B:
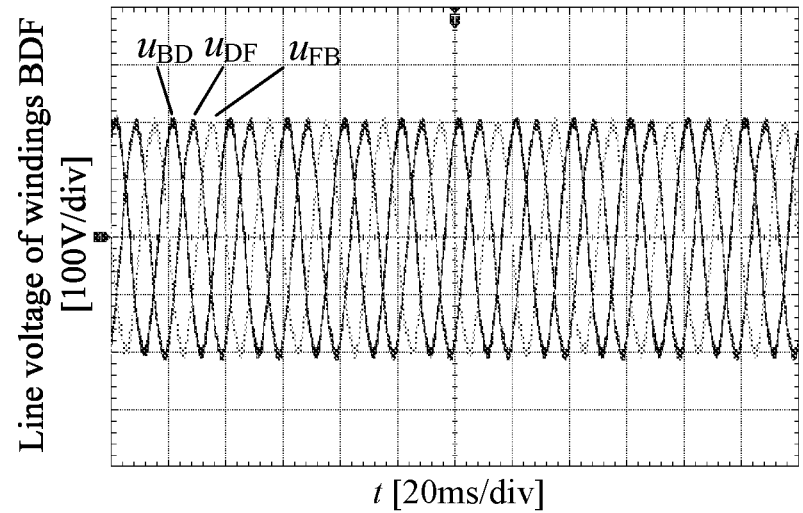
FIG. 10(b) is an experimental waveform of line voltages (after low-pass filtering) of windings BDF in the $IV^{th}+IX^{th}$-type $\lambda_0^{th}$-class synthesis solution of the embodiment shown in FIG. 1.

Referring to FIG. 10(b), it can be seen that line voltages $u_{BD}$, $u_{DF}$ and $u_{FB}$ of the windings BDF in the $IV^{th}+IX^{th}$-type $\lambda_0^{th}$-class synthesis solution of the present invention after low-pass filtering are also sinusoidal waves, and similar to conditions of the line voltages of the windings ACE, amplitudes are all about 210V, frequency is 50 Hz, phase differences are sequentially 120°, and there are no third, fifth and seventh low-frequency harmonics and the like.

Referring to FIG. 10(a) and FIG. 10(b), it can be seen that phase differences between the line voltages of the windings ACE and the line voltages of the windings BDF in the $IV^{th}+IX^{th}$-type $\lambda_0^{th}$-class synthesis solution of the present invention are 60°.

Figure 10C:
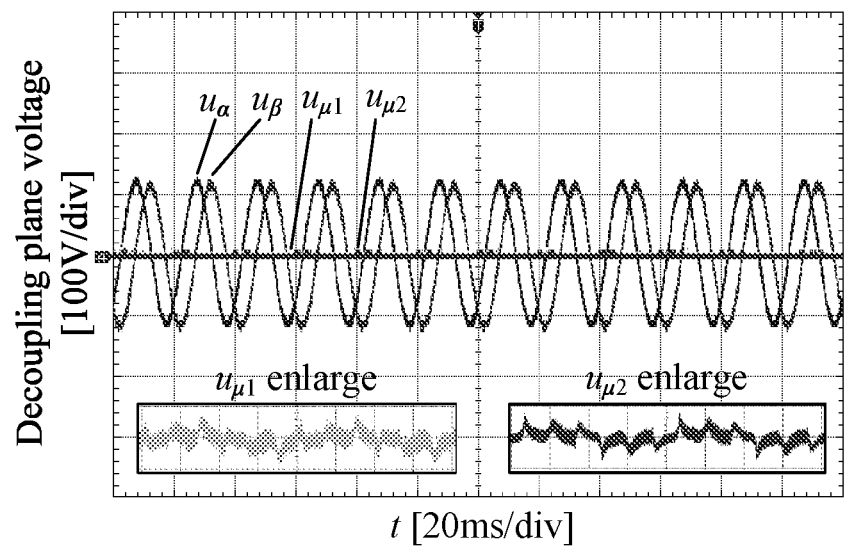
FIG. 10(c) shows α-β plane voltages (after low-pass filtering) and $\mu_1$-$\mu_2$ plane voltages (after low-pass filtering) after coordinate transformation of the experimental waveforms of the line voltages of the six windings in the $IV^{th}+IX^{th}$-type $\lambda_0^{th}$-class synthesis solution of the embodiment shown in FIG. 1.

Referring to FIG. 10(c), it can be seen that α-β plane voltages $u_\alpha$ and $u_\beta$ after coordinate transformation of experimental waveforms of the line voltages of the six windings in the $IV^{th}+IX^{th}$-type $\lambda_0^{th}$-class synthesis solution of the present invention after low-pass filtering are all sinusoidal waves, amplitudes are about 120V, frequency is 50 Hz and phase differences are 90°. This indicates that the voltages of the electromechanical energy conversion plane are symmetric. When a stator resistance drop is ignored, integrals of $u_\alpha$ and $u_\beta$ are equal to stator flux linkages $\psi_\alpha$ and $\psi_\beta$ respectively, so that $\psi_\alpha$ and $\psi_\beta$ are also symmetric, and a stator flux linkage vector trajectory is a circle.

Referring to FIG. 10(c), it can be seen that $\mu_1$-$\mu_2$ plane voltages $u_{\mu1}$ and $u_{\mu2}$ after coordinate transformation of the experimental waveforms of the line voltages of the six windings in the $IV^{th}+IX^{th}$-type $\lambda_0^{th}$-class synthesis solution of the present invention after low-pass filtering are also sinusoidal waves, the waveforms are kept unchanged before and after loading, amplitudes are very low and about 4V, frequency is 50 Hz and phase differences are 90°.

Figure 10D:
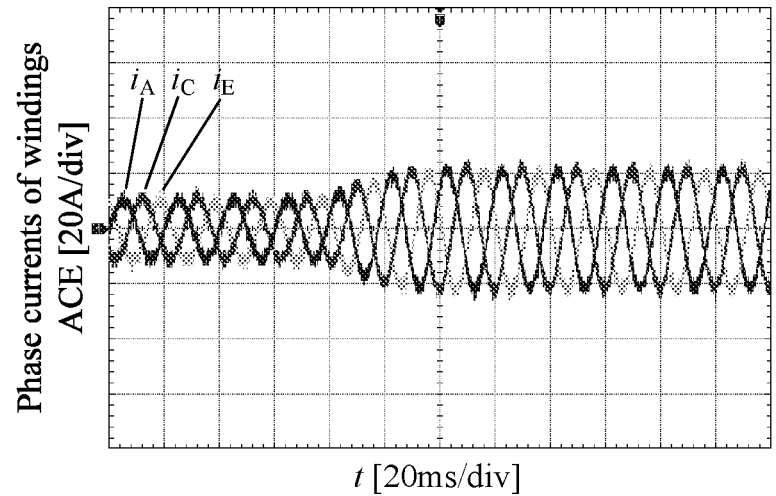
FIG. 10(d) is an experimental waveform of phase currents of the windings ACE in the $IV^{th}+IX^{th}$-type $\lambda_0^{th}$-class synthesis solution of the embodiment shown in FIG. 1.

Referring to FIG. 10(d), it can be seen that phase currents $i_A$, $i_C$ and $i_E$ of the windings ACE in the $IV^{th}+IX^{th}$-type $\lambda_0^{th}$-class synthesis solution of the present invention are all sinusoidal waves, unloaded amplitudes are all about 10 A, loaded amplitudes are all about 20 A, frequency is 50 Hz, phase differences are sequentially 120°, and there are no third, fifth and seventh low-frequency harmonics and the like.

Figure 10E:
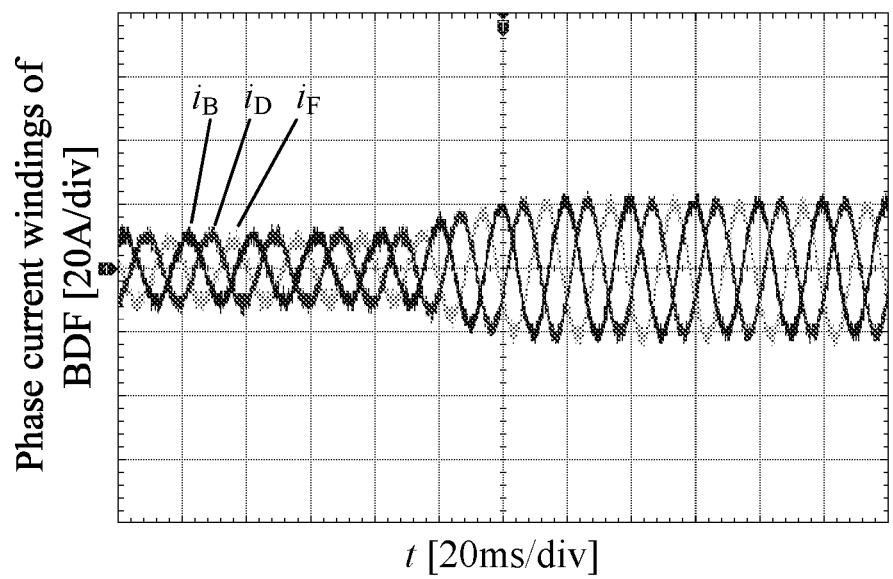
FIG. 10(e) is an experimental waveform of phase currents of the windings BDF in the $IV^{th}+IX^{th}$-type $\lambda_0^{th}$-class synthesis solution of the embodiment shown in FIG. 1.

Referring to FIG. 10(e), it can be seen that phase currents $i_B$, $i_D$ and $i_F$ of the windings BDF in the $IV^{th}+IX^{th}$-type $\lambda_0^{th}$-class synthesis solution of the present invention are also sinusoidal waves, and similar to conditions of the phase currents of the windings ACE, unloaded amplitudes are all about 10 A, loaded amplitudes are all about 20 A, frequency is 50 Hz, phase differences are sequentially 120°, and there are no third, fifth and seventh low-frequency harmonics and the like.

Referring to FIG. 10(d) and FIG. 10(e), it can be seen that phase differences between the phase currents of the windings ACE and the phase currents of the windings BDF in the $IV^{th}+IX^{th}$-type $\lambda_0^{th}$-class synthesis solution of the present invention are 60°.

Figure 10F:
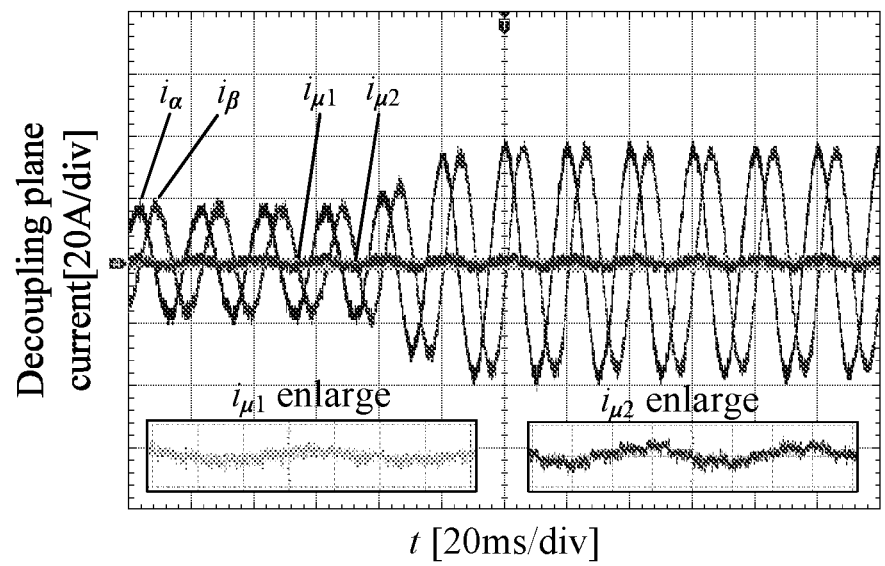
FIG. 10(f) shows α-β plane currents and $\mu_1$-$\mu_2$ plane currents after coordinate transformation of the experimental waveforms of the phase currents of the six windings in the $IV^{th}+IX^{th}$-type $\lambda_0^{th}$-class synthesis solution of the embodiment shown in FIG. 1.

Referring to FIG. 10(f), it can be seen that α-β plane currents $i_\alpha$ and $i_\beta$ after coordinate transformation of experimental waveforms of the phase currents of the six windings in the $IV^{th}+IX^{th}$-type $\lambda_0^{th}$-class synthesis solution of the present invention are all sinusoidal waves, unloaded amplitudes are all about 20 A, loaded amplitudes are all about 40 A, frequency is 50 Hz and phase differences are 90°. This indicates that the currents of the electromechanical energy conversion plane are symmetric.

Referring to FIG. 10(f), it can be seen that $\mu_1$-$\mu_2$ plane currents $i_{\mu1}$ and $i_{\mu2}$ after coordinate transformation of the experimental waveforms of the phase currents of the six windings in the $IV^{th}+IX^{th}$-type $\lambda_0^{th}$-class synthesis solution of the present invention are also sinusoidal waves, the waveforms are kept unchanged before and after loading, amplitudes are very low and about 2 A, frequency is 50 Hz and phase differences are 90°.

Figure 10G:
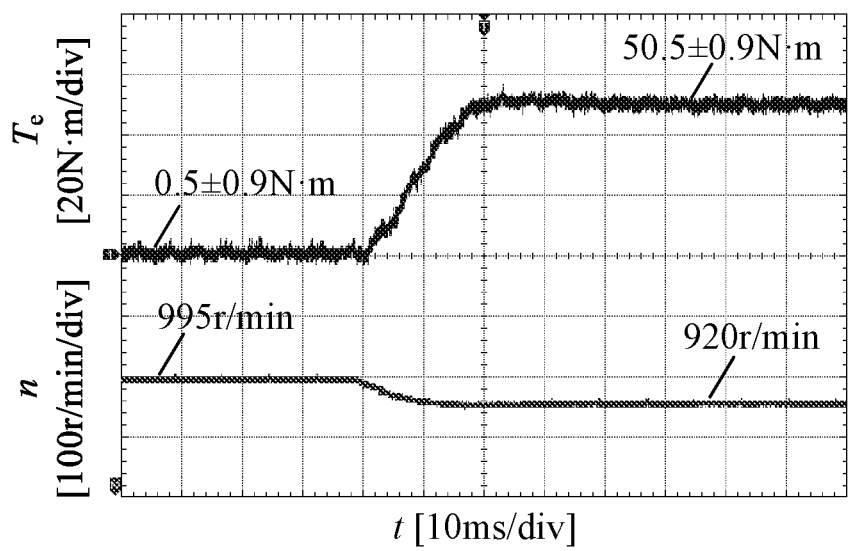
FIG. 10(g) is an experimental waveform of an electromagnetic torque and a rotating speed of a rotor in the $IV^{th}+IX^{th}$-type $\lambda_0^{th}$-class synthesis solution of the embodiment shown in FIG. 1.

Referring to FIG. 10(g), it can be seen that a transition process before and after loading of an electromagnetic torque and a rotating speed of a rotor in the $IV^{th}+IX^{th}$-type $\lambda_0^{th}$-class synthesis solution of the present invention is stable, and transition time is about 30 ms. An unloaded torque is 0.5±0.9N·m, a loaded torque is 50.5±0.9N·m, and a pulsation frequency is 100 Hz. An unloaded rotating speed is 995 r/min, and a loaded rotating speed is 920 r/min. Due to an open-loop experiment, a rotating speed drop exists, and the rotating speed drop may be reduced or eliminated by adopting rotating speed feedback control.

The foregoing experimental results show that the present invention may effectively suppress a magnitude and frequency of a common-mode voltage of a multiphase motor and has a good harmonic suppression effect on a line voltage and a phase current and high steady state and dynamic performance of a torque and a rotating speed.

Those skilled in the art may make various modifications and transformations to the present invention. If these modifications and transformations fall within the scope of the claims of the present invention and an equivalent technology thereof, these modifications and transformations also fall within the scope of protection of the present invention. Contents undetailed in the description are existing technologies well known to those skilled in the art.

What is claimed is:

1. A space vector pulse width modulation (SVPWM) method for suppressing a common-mode voltage of a multiphase motor, comprising the following steps:
   (1) dividing all basic vectors of the multiphase motor into q types, and selecting therefrom x types having an equal common-mode voltage magnitude of which an absolute value is smallest;
   (2) for each type in the x types of basic vectors, structuring y classes of auxiliary vectors according to an optimization model;
   (3) synthesizing reference vectors by the auxiliary vectors to obtain functioning time of basic vectors functioning in each switching period; and
   (4) obtaining a functioning sequence of the basic vectors functioning in each switching period with fewest switching operations of a converter as a target.

2. The SVPWM method for suppressing the common-mode voltage of the multiphase motor according to claim 1, wherein in step (1), when the multiphase motor comprises p suspended star nodes, p common-mode voltages exist; value combination of the p common-mode voltages result in q conditions, all the basic vectors are divided into the q types according to the q conditions; and the x types of basic vectors are selected from the q types of basic vectors, magnitudes of the p common-mode voltages of the x types of basic vectors are equal, and their absolute values are smallest.

3. The SVPWM method for suppressing the common-mode voltage of the multiphase motor according to claim 1, wherein in step (2), the optimization model is:

$$\max \left| \sum_h T_h V_h \right| \text{ on an electromechanical energy conversion plane}$$

$$s.t. \begin{cases} T_h \geq 0 \\ \sum_h T_h = T' \\ \left| \sum_h T_h V_h \right| = \lambda \end{cases}$$

in a non-electromechanical energy conversion subspace, wherein, in the optimization model, h is a basic vector number, $V_h$ is the $h^{th}$ basic vector in the $x_i^{th}$-type basic vectors, $T_h$ is the functioning time of the $h^{th}$ basic vector in the $x_i^{th}$-type basic vectors and is an optimization variable, $$\sum_h T_h$$

is total functioning time of each basic vector in the $x_i^{th}$-type basic vectors, T' is a control period, the control period being a time period shorter than the switching period, $$\left| \sum_h T_h V_h \right|$$

is a length of a synthesis result of the $x_i^{th}$-type basic vectors, $\lambda$ is a parameter reflecting a magnitude of a harmonic voltage of the non-electromechanical energy conversion subspace, the harmonic voltage of the non-electrochemical energy conversion subspace is lower if $\lambda$ is smaller, and a minimum value of $\lambda$ is zero;
   a target function of the optimization model is that the length of the synthesis result of the $x_i^{th}$-type basic vectors is largest on the electromechanical energy conversion plane, and there are three constraint conditions of the optimization model: the first constraint condition is that the functioning time of each basic vector in the $x_i^{th}$-type basic vectors is a nonnegative value, the second constraint condition is that the total functioning time of each basic vector in the $x_i^{th}$-type basic vectors is equal to the control period, and the third constraint condition is that the length of the synthesis result of the $x_i^{th}$-type basic vectors is equal to $\lambda$ in the non-electromechanical energy conversion subspace;
   wherein a sequential quadratic programming algorithm is adopted to solve the first constraint condition, the second constraint condition and the third constraint condition simultaneously to obtain three optimal solutions,
   when $\lambda$ comprises y values, that is, $\lambda=\lambda_0, \lambda_1, \lambda_2, \ldots, \lambda_{y-1}$, for the $x_i^{th}$-type basic vectors, y classes of auxiliary vectors, sequentially called as $x_i^{th}$-type $\lambda_0^{th}$-class auxiliary vectors, $x_i^{th}$-type $\lambda_1^{th}$-class auxiliary vectors, $x_i^{th}$-type $\lambda_2^{th}$-class auxiliary vectors, ..., $x_i^{th}$-type $\lambda_{y-1}^{th}$-class auxiliary vectors, are structured; and
   for all of the x types of basic vectors, totally x·y classes of auxiliary vectors are obtained, the x·y classes of auxiliary vectors are stored off line, and during an online application, a plurality of classes of auxiliary vectors are selected from the x·y classes of auxiliary vectors to synthesize the reference vectors in real time according to a common-mode voltage performance requirement and a harmonic voltage performance requirement.

4. The SVPWM method for suppressing the common-mode voltage of the multiphase motor according to claim 1, wherein in step (3), the reference vectors are synthesized by virtue of the auxiliary vectors, and in a synthesis process, only a synthesis condition of the electromechanical energy conversion plane is considered, and a synthesis condition of the non-electromechanical energy conversion subspace is not considered; there are x types of synthesis solutions, which are single-type synthesis solutions, double-type synthesis solutions, ..., x−1-type synthesis solutions and x-type synthesis solutions, and for each type of synthesis solutions, when A comprises y values, that is, $\lambda=\lambda_0, \lambda_1$, $\lambda_2, \ldots, \lambda_{y-1}$, there are y classes of synthesis solutions, and different solutions are selected according to a requirement; and for any solution, functioning time of each auxiliary vector in each switching period is obtained first, then the functioning time of each auxiliary vector is allocated to functioning basic vectors, and the functioning time of the basic vectors functioning in each switching period is finally obtained.

5. The SVPWM method for suppressing the common-mode voltage of the multiphase motor according to claim 4, wherein for the single-type synthesis solutions, when $\lambda$ comprises y values, that is, $\lambda = \lambda_0, \lambda_1, \lambda_2, \ldots, \lambda_{y-1}$, there are $x_i^{th}$-type $\lambda_0^{th}$-class synthesis solutions, $x_i^{th}$-type $\lambda_1^{th}$-class synthesis solutions, $x_i^{th}$-type $\lambda_2^{th}$-class synthesis solutions, ..., $x_i^{th}$-type $\lambda_{y-1}^{th}$-class synthesis solutions; and for the double-type synthesis solutions, when $\lambda$ comprises y values, that is, $\lambda = \lambda_0, \lambda_1, \lambda_2, \ldots \lambda_{y-1}$, there are $x_i^{th}+x_{i+1}^{th}$-type $\lambda_0^{th}$-class synthesis solutions, $x_i^{th}+x_{i+1}^{th}$-type $\lambda_1^{th}$-class synthesis solutions, $x_i^{th}+x_{i+1}^{th}$-type $\lambda_2^{th}$-class synthesis solutions, ..., $x_i^{th}+x_{i+1}^{th}$-type $\lambda_{y-1}^{th}$-class synthesis solutions.

6. The SVPWM method for suppressing the common-mode voltage of the multiphase motor according to claim 1, wherein in step (4), for any synthesis solution, for reducing switching loss of the converter, the functioning sequence of the basic vectors functioning in each switching period with the fewest switching operations, and an optimality principle is adopted for sequencing, specifically as follows, comprising:

step 1: structuring a set $G\{G_j|j$ being a positive integer$\}$, the set G comprising j elements, which are j basic vectors functioning in each switching period;

step 2: randomly selecting an element from the set G as a first vector, and removing the first vector from the set G with j−1 elements left;

step 3: arranging the first vector with each element in the set G, totally j−1 arrangements, selecting l arrangements corresponding to a lowest switching frequency, and removing the l vectors from the set G with (j−1−l) elements left;

step 4: arranging the l arrangements with each element in the set G, totally l·(j−1−l) arrangements, selecting w arrangements corresponding to a lowest switching frequency, and removing the w vectors from the set G with (j−1−l−w) elements left; and step 5: performing analogic processing according to step 4, and ending sequencing when there is 0 element left in the set G.

\* \* \* \* \*